(12) United States Patent
Laraqui et al.

(10) Patent No.: US 9,509,605 B2
(45) Date of Patent: Nov. 29, 2016

(54) METHODS AND APPARATUSES FOR HANDLING COMMUNICATION IN A COMMUNICATION SYSTEM COMPRISING AN ACCESS POINT AND A WIRE LINE NETWORK NODE CONNECTED VIA WIRE LINE TO THE ACCESS POINT

(71) Applicant: Telefonaktiebolaget L M Ericsson (publ), Stockholm (SE)

(72) Inventors: Kim Laraqui, Solna (SE); Henrik Almeida, Hagersten (SE); Per-Erik Eriksson, Stockholm (SE); Chenguang Lu, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 20 days.

(21) Appl. No.: 14/365,036

(22) PCT Filed: May 9, 2014

(86) PCT No.: PCT/SE2014/050570
§ 371 (c)(1),
(2) Date: Jun. 12, 2014

(87) PCT Pub. No.: WO2015/119547
PCT Pub. Date: Aug. 13, 2015

(65) Prior Publication Data
US 2015/0256453 A1      Sep. 10, 2015

Related U.S. Application Data

(60) Provisional application No. 61/936,483, filed on Feb. 6, 2014.

(51) Int. Cl.
*H04W 12/06* (2009.01)
*H04L 12/741* (2013.01)
(Continued)

(52) U.S. Cl.
CPC ............ *H04L 45/74* (2013.01); *H04W 76/022* (2013.01); *H04W 88/18* (2013.01); *H04W 92/06* (2013.01)

(58) Field of Classification Search
CPC .. H04L 45/74; H04W 88/18; H04W 76/022; H04W 93/06
See application file for complete search history.

(56) References Cited

U.S. PATENT DOCUMENTS

| 7,009,951 B2 * | 3/2006 | Kalliokulju | ........... H04L 69/324 370/331 |
| 8,204,502 B2 * | 6/2012 | Khetawat | ................ H04W 8/04 370/230 |

(Continued)

OTHER PUBLICATIONS

PCT Notification of Transmittal of the International Search Report and the Written Opinion of the International Searching Authority for Counterpart PCT Application No. PCT/SE2014/050570, (Sep. 25, 2014), 12 pages.

(Continued)

*Primary Examiner* — Phuc Tran
(74) *Attorney, Agent, or Firm* — NDWE LLP

(57) ABSTRACT

A method is provided performed by an access point for handling uplink communication in a communication system comprising the access point and a wire line network node connected via wire line to the access point. The method comprises receiving an encrypted and/or integrity protected packet data unit, PDU, from a user equipment (UE) wirelessly connected to the access point and detecting type of the received PDU, the type of PDU being any of a signaling radio bearer type or a data radio bearer type. The method further comprises encapsulating the received PDU by setting a header to the PDU, which header comprises an identity indicating the detected type of PDU and an identity indicating a source address and/or a destination address of the PDU, and sending the encapsulated PDU to the wire line network node. Provided is also a corresponding method performed in the wire line network node.

18 Claims, 5 Drawing Sheets

(51) Int. Cl.
*H04W 76/02* (2009.01)
*H04W 88/18* (2009.01)
*H04W 92/06* (2009.01)

(56) References Cited

U.S. PATENT DOCUMENTS

| | | | |
|---|---|---|---|
| 2009/0059848 A1* | 3/2009 | Khetawat | H04L 29/12367 370/328 |
| 2009/0061877 A1* | 3/2009 | Gallagher | H04W 76/022 455/436 |
| 2010/0030423 A1* | 2/2010 | Nathanson | G07C 5/008 701/33.4 |
| 2010/0135215 A1* | 6/2010 | Tang | H04W 72/0413 370/328 |
| 2012/0072719 A1* | 3/2012 | Hui | H04W 12/02 713/156 |
| 2013/0070925 A1* | 3/2013 | Yamada | H04L 9/08 380/255 |
| 2013/0342368 A1* | 12/2013 | Nathanson | G07C 5/008 340/903 |
| 2014/0169320 A1* | 6/2014 | Yi | H04W 24/10 370/329 |
| 2014/0177647 A1* | 6/2014 | Chun | H04W 28/06 370/465 |
| 2014/0254368 A1* | 9/2014 | Zhang | H04L 47/2441 370/235 |
| 2016/0157048 A1* | 6/2016 | Kerai | H04W 84/18 455/41.2 |

OTHER PUBLICATIONS

"Digital cellular telecommunications system (Phase 2+); General Packet Radio Service (GPRS); Base Station System (BSS)—Serving GPRS Support Node (SGSN); BSS GPRS Protocol (BSSGP)", *GSM 08.18 V8.3.0; GSM 08.18 version 8.3.0 Release 1998*, (Apr. 2000), 74 pages.

"Digital cellular telecommunications system (Phase 2+); General Packet Radio Service (GPRS); Mobile Station—Serving Gprs Support Node (MS-SGSN) Logical Link Control (LLC) layer specification", *ETSI TS 101 351 V8.4.0; GSM 04.64 version 8.4.0 Release 1999*, (Aug. 2000), 63 pages.

Bettstetter, et al., "GSM phase 2+ general packet radio service GPRS: Architecture, protocols. and air interface", *IEEE*, vol. 2, No. 3, (Jul. 1, 1999), pp. 2- 14.

Written Opinion of the International Preliminary Examining Authority, Application No. PCT/SE2014/050570, dated Jan. 12, 2016, 8 pages.

International Preliminary Report on Patentability, Application No. PCT/SE2014/050570, dated May 2, 2016, 20 pages.

3GPP TS 36.300, "3rd Generation Partnership Project; Technical Specification Group Radio Access Network; Evolved Universal Terrestrial Radio Access (E-UTRA) and Evolved Universal Terrestrial Radio Access Network (E-UTRAN); overall description; Stage 2 (Release X)," Oct. 2006, 22 pages, V0.1.0, 3GPP Organizational Partners.

3GPP TS 36.300, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10)," Dec. 2014, 195 pages, V10.12.0, 3GPP Organizational Partners.

\* cited by examiner

METHODS AND APPARATUSES FOR HANDLING COMMUNICATION IN A COMMUNICATION SYSTEM COMPRISING AN ACCESS POINT AND A WIRE LINE NETWORK NODE CONNECTED VIA WIRE LINE TO THE ACCESS POINT

CROSS-REFERENCE TO RELATED APPLICATIONS

This application is a National stage of International Application No. PCT/SE2014/050570, filed May 9, 2014, which claims priority to U.S. Application No. 61/936,483, filed Feb. 6, 2014, which are hereby incorporated by reference.

TECHNICAL FIELD

The present disclosure relates generally to methods, access points and wire line network nodes for handling uplink communication in a communication system comprising an access point and a wire line network node connected via wire line to the access point.

BACKGROUND

In a communication system and communication system development, system vendors and operators, come to the realization of the important role that Long Term Evolution, LTE, technology will play in providing sustainable and quality assured services to residential users. It is also apparent to most vendors and operators that copper access seems to become the predominant access technology to feed the vast majority of such users.

There is currently no solution today that combines LTE radio access with fixed broadband access in an efficient way. The only solutions today are various overlay models, where copper access is treated as one realm, and LTE radio access as another realm, both independent of one another. Yet, it is generally agreed that all devices in future residential systems will be connected wirelessly to residential access points. Increasingly, the industry is also realizing that LTE provides the best technology to support such wireless connectivity to residential systems, not least because of its robustness in handling complex radio environments, with multitude of user equipments in homes competing for wireless links inside each home.

The fifth generation of mobile communication technology, 5G, that is predicted to reach some level of maturity starting around 2020, is widely positioned as a solution that marries various radio access technologies under a common mold, largely determined by the architecture and basic constructs that have emerged from LTE, in particular the flat architecture and the LTE bearer concept. In other words, for the coming two decades, those LTE structures will be with us, as the main vehicles to provide wireless and mobile services to end users.

In light of this, there is no reason to pursue the predominant approach of keeping broadband access such as copper broadband access and LTE radio access separate from one another. On the contrary, they should be highly integrated so as to allow for efficient and effective provisioning and assurance of services to future residential systems.

Consequently, there is a need to integrate wire line broadband access with radio access technologies such as LTE, for example for providing residential indoor wireless access to UEs of a household.

SUMMARY

It is an object of the invention to address at least some of the problems and issues outlined above. It is possible to achieve these objects and others by using a method and an apparatus as defined in the attached independent claims.

According to one aspect, a method is provided performed by an access point for handling uplink communication in a communication system comprising the access point and a wire line network node connected via wire line to the access point. The method comprises receiving an encrypted and/or integrity protected PDU from a UE wirelessly connected to the access point, detecting type of the received PDU, the type of PDU being any of a signaling radio bearer type or a data radio bearer type. The method further comprises encapsulating the received PDU by setting a header to the PDU, which header comprises an identity indicating the detected type of PDU and an identity indicating source address and/or destination address of the PDU, and sending the encapsulated PDU to the wire line network node.

According to another aspect, a method is provided performed by a wire line network node for handling uplink communication in a communication system comprising the wire line network node and an access point, the wire line network node being connected via wire line to the access point. The method comprises receiving an integrity protected and/or encrypted and encapsulated PDU from the access point, the PDU originating from a UE wirelessly connected to the access point, the encapsulated PDU comprising a header comprising an identity identifying a type of PDU, the type of PDU being any of a signaling radio bearer type or a data radio bearer type, and an identity indicating source and/or destination address of the PDU. The method further comprises detecting, based on the received identity identifying type of PDU, the type of the received PDU, decapsulating the received PDU and, decrypting the decapsulated PDU, if needed, based on the detected type of PDU, and, if needed, controlling integrity of the received PDU.

According to another aspect, an access point is provided configured for handling uplink communication in a communication system comprising the access point and a wire line network node connected via wire line to the access point. The access point comprises a processor and a memory. Said memory contains instructions executable by said processor, whereby said access point is operative for receiving an integrity protected and/or encrypted PDU from a UE wirelessly connected to the access point and detecting type of the received PDU, the type of PDU being any of a signaling radio bearer type or a data radio bearer type. The access point is further operative for encapsulating the received and integrity protected and/or encrypted PDU by setting a header to the PDU, which header comprises an identity indicating the detected type of PDU and an identity indicating source address and/or destination address of the PDU, and sending the encapsulated PDU to the wire line network node.

According to another aspect, a wire line network node is provided configured for handling uplink communication in a communication system comprising the wire line network node and an access point, the wire line network node being connected via wire line to the access point. The wire line network node comprises a processor and a memory. Said memory contains instructions executable by said processor, whereby said wire line network node is operative for receiving an integrity protected and/or encrypted and encapsulated PDU from the access point, the PDU originating from a UE wirelessly connected to the access point, the encapsulated PDU comprising a header comprising an identity identifying a type of PDU, the type of PDU being any of a signaling radio bearer type or a data radio bearer type, and an identity indicating source and/or destination address of the PDU. The wire line network node is further operative for detecting, based on the received identity identifying type of PDU, the type of the received PDU, decapsulating the received PDU and, if needed, decrypting, the decapsulated PDU based on the detected type of PDU and, if needed, controlling integrity of the received PDU.

According to other aspects, computer programs and carriers containing the computer programs are also provided, the details of which will be described in the claims and the detailed description.

The above method and apparatus may be configured and implemented according to different optional embodiments. Further possible features and benefits of this solution will become apparent from the detailed description below.

BRIEF DESCRIPTION OF DRAWINGS

The solution will now be described in more detail by means of exemplary embodiments and with reference to the accompanying drawings, in which.

DETAILED DESCRIPTION

Briefly described, a solution is described that combines wire line communication entities such as Digital Subscriber Line Access Multiplexer, DSLAM, entities and LTE entities, or similar wireless radio communication entities in order to provide competitive solutions for indoor residential wireless services.

According to an embodiment, this may be achieved by extending the wire line communication entities, e.g. DSLAMs, so that they include necessary LTE radio access functions in order to support relevant residential end user services. This may be done in a way that promotes operator controlled wireless services in homes, whilst still allowing for key functions such as local residential break out of traffic. This solution may also simplify devices, i.e. access points, which need to be deployed in the homes, compared to prior art.

Figure 1:
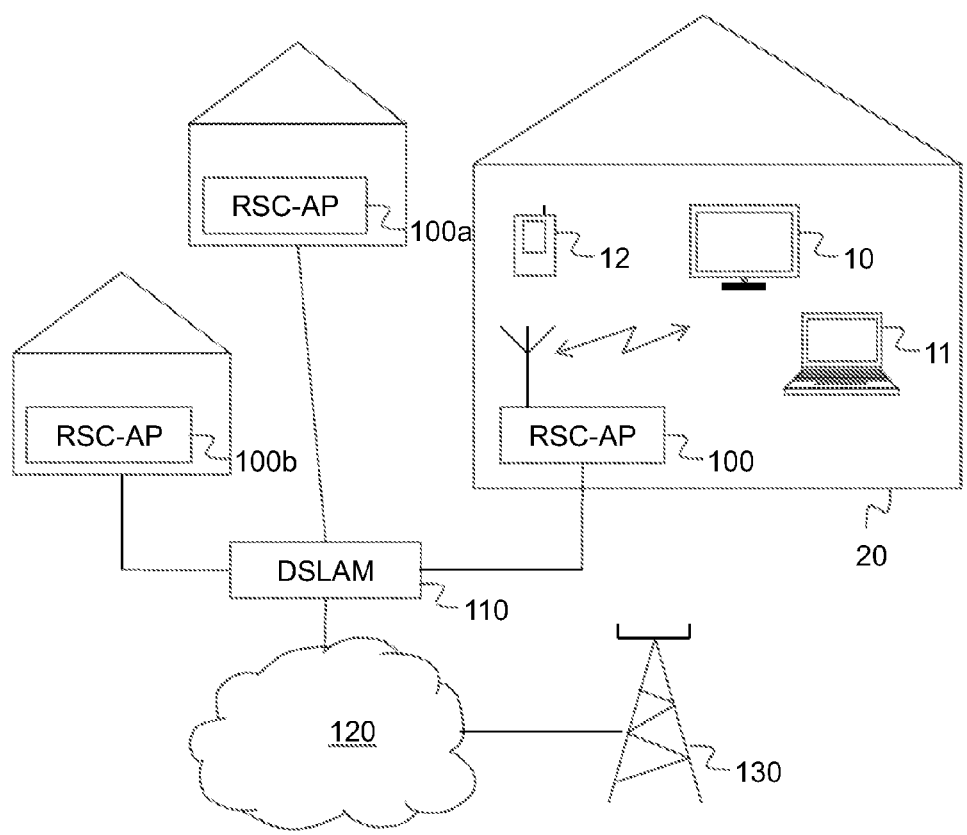
FIG. 1 is a block diagram of a communication system according to possible embodiments.

A communication system according to an embodiment is shown in FIG. 1. In this embodiment, one Residential Small Cell, RSC, may be used per customer premise, such as per house 20, as illustrated in FIG. 1, or per apartment in case of apartment buildings. An RSC-Access Point, RSC-AP 100, provides wireless connection to user equipments 10, 11, 12, or, in other words, wireless communication enabled devices in the premise, i.e. in the RSC. A user equipment, UE, may be for example any of the following devices: a laptop 11, a smart phone 12, a television set 10 etc. Each RSC-AP 100, 100a, 100b may comprise a stripped-down eNodeB, and a modem such as a G.fast/xDSL modem. The RSC-AP may be simpler than a femto base station. However, base band handling of signals may still be needed at the RSC-AP. The RSC-APs 100, 100a, 100b are connected via wire line, i.e. metallic conductors, to a DSLAM 110. Radio resource control handling normally performed by the RSC-APs may be centralized to the DSLAM 110. Thereby, LTE may provide all needed residential communication services including LTE TV broadcast. Service provisioning may be provided in cooperation with a macro cellular network operating in the same or different frequency bands. The DSLAM 110 is arranged to provide broadband access to the RSC-APs. The DSLAM is connected to an LTE cellular communication network 120 to which a macro eNodeB 130 is connected.

The RSC-APs may provide LTE radio access and optionally WiFi access to the UEs. The DSLAM may provide broadband access that has the possibility to provide many or even all radio access technologies, i.e. 3GPP, WiFi etc. to the RSC-APs.

A DSLAM has a number of standard functions, such as to bridge between metallic conductor, e.g. copper, access and higher parts of the network, to control usage of metallic conductor resources and to act as a demarcation point between metallic conductor access and the higher parts of the network. In addition to the DSLAM standard functions, the 5G DSLAM also contains LTE Radio Access Network (RAN) entities.

In LTE, radio access is implemented by means of a number of protocols, most notably Medium Access (MAC) at Layer 2, Radio Link Control (RLC) at Layer 3, and Packet Data Convergence (PDCP) Protocols at Layer 4. The UE side uses the same protocols. The PDCP entity above the RLC entity mainly provides header compression and ciphering/deciphering in addition to integrity protection of user data. User data is normally in the form of IP packets to and from the UE. On the radio base station, RBS, side these packets are then mapped onto a transport tunnel, GTP, GPRS Tunneling Protocol, back/from the core network. There is one PDCP entity per radio bearer. There are two kinds of radio bearers; Signaling Radio Bearers, SRB 1&2, and a number of Data Radio Bearers, DRB. The DRB, when concatenated with a S1 and a S5/S8 bearer in the transport domain, forms an EPS bearer. The EPS bearer is the fundamental connection entity in LTE that provides end-to-end services between a UE and the Internet et al.

As for SRB, there are two dedicated SRBs defined: SRB1 to carry RRC, Radio Resource Control, signaling to control the radio bearers, and SRB2 to control the transport parts of Non-Access Stratum, NAS. SRB2 can carry signaling between the UE and the MME, Mobility Management Entity, in the core. SRB1 can also be used for MME signaling before SRB2 has been established.

Via its service interface to the PDCP entity, RLC provides the PDCP PDU. This PDU is integrity protected and optionally ciphered and compressed, and de-ciphered and decompressed respectively. Ciphering and compression functions are implemented primarily to protect control and user data over the air interface.

Figure 2:
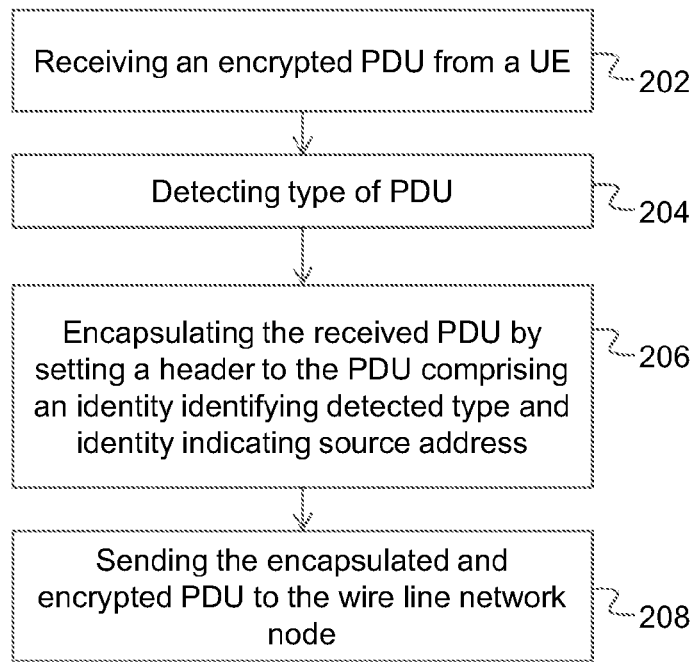
FIG. 2 is a flow chart illustrating a method performed by an access point, according to possible embodiments.

FIG. 2 shows a flow chart of an embodiment of a method performed by an access point 100 (see FIG. 1) for handling uplink communication in a communication system comprising the access point and a wire line network node 110 connected via wire line to the access point. The method comprises receiving 202 an encrypted and/or integrity protected packet data unit, PDU, from a UE 10, 11, 12 wirelessly connected to the access point, and detecting 204 type of the received PDU, the type of PDU being any of a signaling radio bearer type or a data radio bearer type. The method further comprises encapsulating 206 the received PDU by setting a header to the PDU, which header comprises an identity indicating the detected type of PDU and an identity indicating source address and/or destination address of the PDU, and sending 208 the encapsulated PDU to the wire line network node. The method may further comprise that the identity of the type of PDU can be inferred from the source address or other field of the encapsulated PDU.

The access point may communicate wirelessly with UEs in a geographical area, e.g. cell that the access point covers. That the access point is connected via wire line to the wire line network node may signify that the access point is connected via optical fibers or metallic conductors, e.g. twisted pair wires, copper wires or coaxial cables, to the wire line network node. The access point may be communicating using e.g. DSL or G.fast with the wire line network node. The access point may be an RSC-AP. The wire line network node may be a DSLAM or any equivalent node in a twisted-pair wire system, a coaxial distribution system, e.g. a head end, or in an optical distribution system, e.g. an optical line termination, OLT. The PDU exchanged between the access point and the wire line network node may be any type of PDU that is on a level not interfering with air interface (i.e. wireless) security mechanisms for integrity and/or authentication, typically a PDCP PDU or a RLC PDU. The PDU may also be a PDU for other radio technologies such as Wireless Local Area Network, WLAN, technologies.

The access point may detect type of PDU based on context. When a UE has established an LTE connection to the network, the LTE radio access system creates one RLC entity for each bearer between the UE and the access point. The PDUs, e.g. PDCP PDUs are exchanged over the RLC entities depending on type of bearer. Consequently, depending on which RLC entity the PDU is received, the access point can detect type of PDU and also from which UE the PDU originated. The header set to the integrity protected and/or encrypted PDU by the access point is given according to an addressing procedure known to the wire line network node. An example of addressing procedure is given further down in this document.

The feature "the PDU being encrypted and/or integrity protected" illustrates the difference in how PDUs are treated depending on which type of PDU it is. Typically, SRBs are integrity protected but not encrypted, whereas DRBs are encrypted.

The identity indicating source address and/or destination address of the packet may be one or more of the group comprising: an identity indicating to which data flow the PDU belongs, an identity of the UE from which the PDU originated and an address to which communication node the PDU is destined, e.g. an ID of a receiving UE. To send the encapsulated PDU to the wire line network node may signify always sending the PDU to the wire line network node and not sending the PDU to any other node. In other words, the access point always sends PDUs received from a UE connected to the access point further to the wire line network node. In other words, the access point acts as a host, i.e. it sends all PDUs received from the UEs automatically to the wire line network node.

By such a solution, wire line broadband access is integrated with radio access technologies such as LTE, for example for providing residential indoor wireless access to UEs of a household. Further, a simplified access point is achieved. Switching functionality that regularly is positioned in the access point is moved to the wire line network node. The wire line network node is then responsible for routing the PDU. A simplified access point means that the access point is cheaper to produce and possibly also that it may be built up of standard components. For a communication system with thousands of access points, e.g. having an access point placed in each home or similar limited area, the total cost for such a system would be lowered significantly. For being able to simplify the access point, the PDU is encapsulated by setting a header to the PDU, the header comprising an identity identifying type of PDU and an identity indicating source and/or destination address of the PDU and to send the encapsulated PDU to the wire line network node. Thereby, the wire line network node can identify a logical channel of the PDU and the access point can just pass the PDU to the wire line network node that decapsulates the PDU and passes it further for further processing by the radio network according to e.g. regular LTE processing.

According to an embodiment, the PDU is encapsulated by wrapping the PDU into a wire line transport protocol, e.g. Ethernet, MAC, MPLS, IPv6, xDSL, Gigabit Passive Optical Network, GPON, or Ethernet Passive Optical Network, EPON.

According to another embodiment, the identity indicating the detected type of PDU is a MAC logical channel identity.

According to another embodiment, the identity indicating source address and/or destination address in the header of the PDU is an identity indicating from which UE the PDU originates but not any identity indicating the access point the PDU is sent from. The wire line network node, e.g. DSLAM, needs information regarding logical channel to which the PDU belongs. Therefore it needs information of which access point that sent a certain PDU. According to this embodiment, instead of sending this information to the DSLAM, the identity of the sending access point is indicated by an identity of the input port of the wire line network node to which input port the access point is connected. The DSLAM knows from configuration which access point that is connected to which of its input ports. According to an alternative embodiment it is also possible to send an identity of the access point to the DSLAM in the header set to the PDU.

According to another embodiment, the identity indicating source address and/or destination address in the header of the PDU is pre-configured or automatically provisioned.

According to another embodiment, the identities indicating source and/or destination address of PDUs used in the access point is independent from identities indicating source and/or destination address of PDUs used in other access points in the communication network connected via wire line to the wire line network node.

Figure 3:
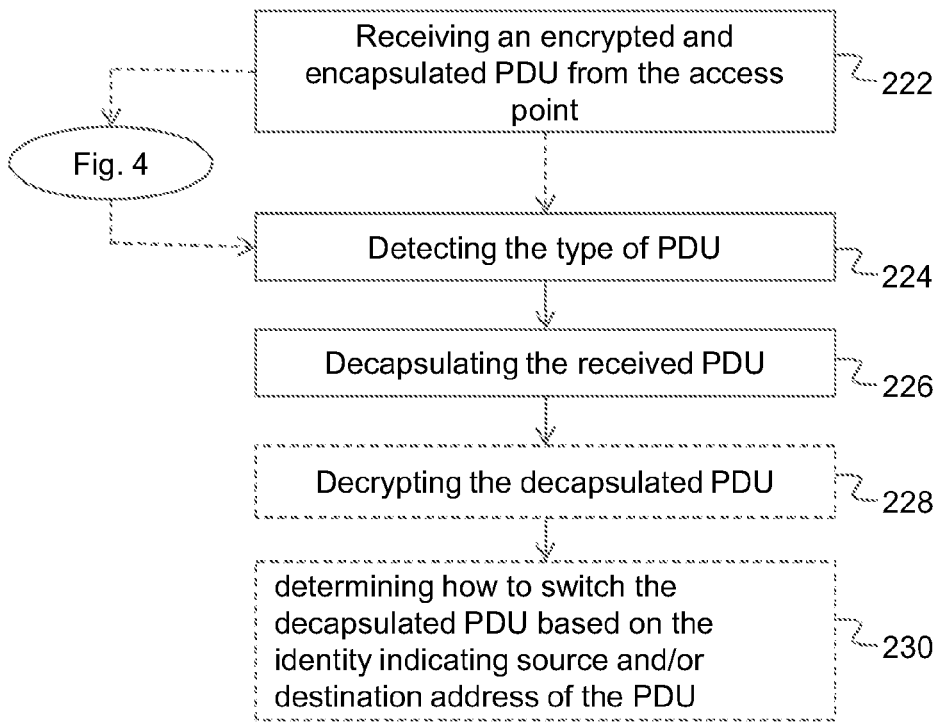
FIGS. 3-4 are flow charts illustrating methods performed by a wire line network node, according to possible embodiments
Figure 4:
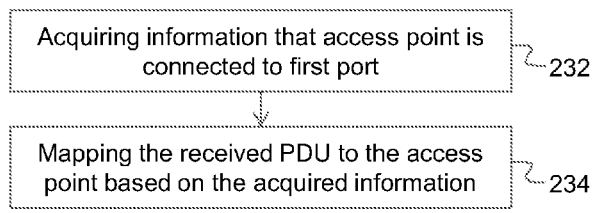

According to another embodiment shown in FIG. 3, a method is provided performed by a wire line network node 110 (see FIG. 1) for handling uplink communication in a communication system comprising the wire line network node and an access point 100, the wire line network node being connected via wire line to the access point. The method comprises receiving 222 an integrity protected and/or encrypted and encapsulated PDU from the access point, the PDU originating from a user equipment, UE 10, 11, 12 wirelessly connected to the access point. The encapsulated PDU comprises a header comprising an identity identifying a type of PDU, the type of PDU being any of a signaling radio bearer type or a data radio bearer type, and an identity indicating source and/or destination address of the PDU. The method further comprises detecting 224, based on the received identity identifying type of PDU, the type of the received PDU, decapsulating 226 the received PDU, and, if needed, controlling integrity for the decapsulated PDU and/or decrypting 228 the decapsulated PDU based on the detected type of PDU.

Thereby, wire line broadband access is integrated with radio access technologies such as LTE, for example for providing residential indoor wireless access to UEs of a household. Further, switching functionality that regularly is positioned in the access point is moved to the wire line network node. The wire line network node is then responsible for routing the PDU. Thereby it is possible to perform a local break out at the wire line network node, i.e. it is possible at the wire line network node to route the PDU directly to an access point connected to the same wire line network node as the access point from which the PDU originated. In this case the PDU does not have to be sent further up in the network for later routing it back to the same wire line network node. The method may further comprise a step of determining 230 how to switch the decapsulated PDU based on the identity indicating source and/or destination address of the PDU.

According to another embodiment, the method further comprises forwarding the PDU, based on the detected type, to a packet treating entity, e.g. an RRC or a NAS, adapted for treating PDUs of the detected type. The decapsulation 226 and, if needed, the controlling of integrity and/or the decryption 228 is then performed by the packet treating entity adapted for treating PDUs of the detected type. Thereby, the PDU can be correctly treated by the wire line network node depending on type.

According to another embodiment, the wire line network node has a plurality of ports each port being adapted for receiving data from one access point out of a plurality of access points, and the access point from which the PDU is received is connected to a first port of the plurality of ports. The method further comprises acquiring 232 information that the access point from which the PDU is received is connected to the first port, and mapping 234 the received PDU to the access point from which the PDU is received based on the acquired information.

By mapping the PDU to the access point from which it is received based on information on which port the PDU is received, it is not necessary for the access point to send information identifying itself to the PDU. Instead, the wire line network node (e.g. DSLAM) knows from configuration which access point that is connected to which port, and with information on which port the PDU was received the DSLAM can determine from which access point the PDU was received. Since an identity of sending access point is not necessary to send, all (or at least many) access points in such a communication system may use the same mapping scheme for its PDUs. This means that all access points in such a communication system may be provisioned with the same pre-configuration. I.e., the same address space may be used for all access points.

Figure 5:
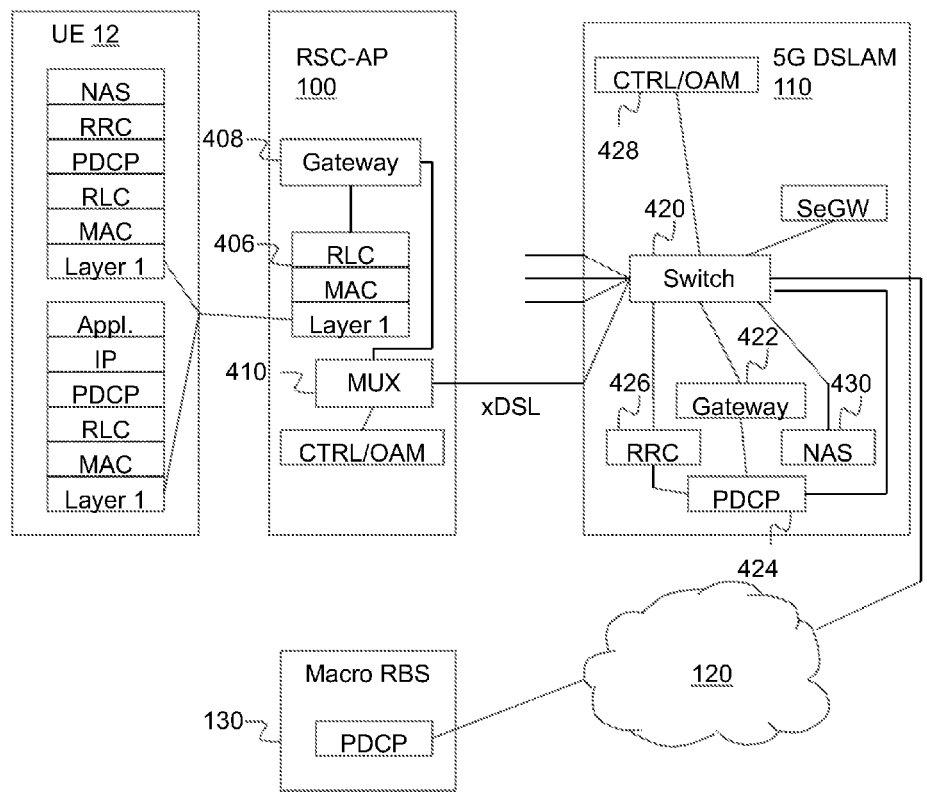
FIG. 5 is a block diagram of a communication system according to further possible embodiments.

According to an embodiment as shown in FIG. 5, the RSC-AP 100 comprises entities 406 for treating the lower levels of LTE RAN, i.e. Layer 1, MAC, RLC. Alternatively, or in addition, equivalent levels for other radio access technologies may be treated, e.g. CAPWAP-based for WiFi. Both DRBs and SRBs are received as PDCP PDUs from the UEs 12 above the RLC layer and are then wrapped by the RSC-AP into an appropriate transport mechanism by means of a gateway, GW 408, according to an algorithmic mapping. Examples of transport mechanism protocols are e.g. Ethernet MAC, MPLS, IPv6 and xDSL.

For each PDCP PDU, the RSC-AP may keep track of which UE 12 and which logical channel it serves, i.e. if the PDCP PDU belongs to SRB1, SRB2 or any DRB. This may be done at the point where the LTE air interface logical channel is terminated i.e. at the LTE MAC layer interface. Since this MAC layer is located in the RSC-AP, the mapping in the uplink is then performed in this RSC-AP. The PDCP PDU is then decapsulated in the receiving PDCP entity e.g. on the 5G DSLAM 110. This is visible e.g. from the MAC PDU level. The RSC-AP may then derive an address comprising an ID identifying the data flow, i.e. PDUs belonging to the same data flow between the originating UE and a terminating point in the network, in case of uplink communication, and an ID identifying if the PDCP PDU belongs to an SRB1, SRB2 or DRB. The address derived by the RSC-AP may be a locally administered, private 48 bit IEEE MAC Address based on e.g. the following scheme: 8 bits specific to the RSC-AP ID+4 bits based on MAC Logical Channel ID, LCID, thus also identifying if the PDCP PDU belongs to SRB1 or SRB2 or DRB1-8+8 bits unique for each UE/logical channel on the eNB.

The RSC-AP may then add the derived address as a Header to the PDCP PDU, e.g. as an IEEE 802.3 MAC Header to the PDCP PDU, and forward the resulting PDCP PDU with its header, e.g. as an IEEE Ethernet frame to the 5 GDSLAM. The ciphered and integrity protected PDCP PDUs are preferably not to be manipulated in the RSC-AP, in particular, they are preferably not to be deciphered.

It is not necessary for the RSC-AP to have a switch for sending the resulting IEEE Ethernet frame to the 5 GDSLAM, but the RSC-AP may instead have a host entity or a simple multiplexer 410 for the containers that are used to transport PDCP PDUs back and forth between the RSC-AP and the 5G DSLAM.

According to an embodiment, each RSC-AP may be configured to use identical addresses for its PDCP PDUs to/from the 5G DSLAM, since the 5G DSLAM can re-assign addresses, e.g. based on port number between the 5G DSLAM and the RSC-AP. For example, all RSC-APs may be configured to support 100 UEs/home. It may be decided as an operator policy that each such UE may use 10 radio bearers, two for signaling and 8 for user plane data. The following scheme may then be established: The first UE that connects to any RSC-AP will encapsulate its radio bearers using IPv6 address block 00/000-00/009, where 00/000 and 00/001 will be used for signaling and 00/002-00/009 will be used for data bearers. The second UE that connects will be assigned the next available block, e.g. 00/010-00/019 etc. On the 5G DSLAM side, when packets are received, the 5G DSLAM will also factor in from which physical port, i.e. which RSC-AP, the packets are received. It will then add this port number to all packets coming from the RSC-APs, and the reverse operation in the other direction. That way, a PDCP PDU carrying the second signaling bearer, from the third UE connecting to the RSC-AP connected through xDSL port 5, will be received with an IPv6 header 00/021 ($2=3^{rd}$ UE connected to the RSC-AP, and 1=SRB2) and then remarked inside the 5G DSLAM as 05/021. That way, the 5G DSLAM will know that this is a SRB2 PDCP from a UE on the RSC-AP connected to port 5. It will also know that a packet inside the 5G DSLAM, which has been remarked (encapsulated) as 05/024 represents a PDCP PDU flow carrying DRB3. This scheme allows for very scalable solutions inside the 5G DSLAM.

The 5G DSLAM may have a switch/router 420 or similar entity that is arranged to receive packets or circuit data from the DSL side, in the uplink from the RSC-AP 100. The switch/router may also be arranged to remap the received PDCP PDUs based on an input port from which the PDCP flow was received. Individual RSC-APs may be connected to individual input ports. In FIG. 5 the input ports are illustrated by the four lines starting from the 5 GDSLAM 110 from which one ends in the depicted RSC-AP 100. Individual RSC-APs may be connected to individual of the other three lines. Of course there may be more or less than three extra lines/connections/input ports. This will allow for all RSC-AP gateways to use the same mapping scheme of PDCP PDUs onto DSL. That in turn will make it possible for all RSC-APs connected to one 5 GDSLAM to be provisioned with the exact same factory pre-configuration.

The switch/router 420 of the 5G DSLAM will know from the packet header of the received encapsulated PDU, e.g. IEEE Ethernet frame, how to switch the encapsulated PDU. This is possible since the packet header, as mentioned, comprises information regarding whether the PDCP PDU belongs to an SRB1, SRB2 or DRB. Before forwarding to a PDCP entity 424 of the 5G DSLAM, the 5 GDSLAM decapsulates the PDU, by e.g. an internal gateway 422, so that the PDCP PDU can be forwarded to the correct PDCP entity 424, for the particular bearer. The PDCP entity decrypts the received PDU. There is one PDCP entity instance per bearer.

If the PDCP PDU is a control packet, i.e. an SRB1 or SRB2, then the PDCP PDU may be forwarded to an RRC entity 426 of the 5 GDSLAM. The RRC entity can map NAS messages back and forth to the LTE communication network by means of a direct link to the 5G DSLAM switch. If the PDCP PDU is a user plane packet, then the PDCP entity may forward it to the switch 420 for further forwarding towards the core network.

The RRC entity in the 5G DSLAM can trigger a control/Operation, administration and Management, OAM, entity 428 in the 5G DSLAM to interact with any connectivity controller in the LTE communication network. For example, the RRC entity 426, upon detection of a signaling message over an SRB, can trigger an OpenFlow controller higher up to establish a secure L2 or L3 path from the 5G DSLAM to some NAS or SGw/PGw entity higher up in the communication network.

Since the PDCP entity 424 of the DSLAM decrypts and analyses the received PDCP PDU and, assisted by the gateway 422 which by means of the IPv6 or other packet header knows if it is an SRB1, SRB2 or a DRB, the PDCP PDU can be forwarded by the switch to the correct packet treating entity, e.g. RRC 426, NAS 430. The packet treating entity encrypts the PDU with an encryption that the receiving entity, e.g. UE or node, understands. If the receiving UE is treated by the same 5G DSLAM, the PDCP PDU may be sent directly to the UE, so called local break out. If the receiving UE or node is treated anywhere else in the network the PDCP PDU may be sent to the LTE network for further distribution.

The embodiments described simplify the RSC-AP by centralizing key functions inside the 5G DSLAM, in particular in support of local break out of traffic and of mapping any radio access bearer or equivalent to any other radio access bearer, e.g. LTE to/from WiFi. For the WiFi-to-LTE case, WiFi packets from an RSC-AP may typically use The Control And Provisioning of Wireless Access Points, CAPWAP, protocol to encrypt and forward user and management frames from a WiFi station, e.g. UE, to a WiFi access controller. This WiFi access controller can reside on the 5G DSLAM, such that WiFi packets can be decrypted and forwarded to a PDCP unit on the 5G DSLAM for forwarding over an established LTE DRB.

Since functions for local break out of traffic is located on the 5G DSLAM, the solution supports a straightforward application of 3GPP authentication and encryption principles, since the role of a standard 3GPP eNodeB is now assumed by the 5G DSLAM.

All RSC-APs can be configured in identical ways, since any packet wrapping of PDCP PDUs can be re-mapped on the 5G DSLAM, e.g. based on DSLAM ports of the connected residential small cells. This means that all RSC-APs could be identically pre-configured, before installation, e.g. all with the same setup of IPv6 addresses to carry PDCP PDUs.

The 5G DSLAM allows adjacent residential small cells to co-process their PDCP PDUs on the same location, i.e. same 5G DSLAM, e.g. for bearer splitting, dual connectivity etc. It also enables forwarding PDCP PDUs to remote PDCP entities e.g. such as those located on macro RBSs overlapping the residential small cells.

When routing the encapsulated PDUs in the 5G DSLAM or in networks above, towards the core network, to some PDCP entity higher up, e.g. in an packet header, the packet header may typically contain a source and a destination address. Many schemes can be envisaged in using these fields, e.g. only route on the source address, used therefore to identify the bearer/RSC-AP/UE instance, and complement this scheme with a flow identifier, to know the direction to forward this flow to, i.e. uplink or downlink, or leave source addresses blank and only use destination addresses for the same purpose, etc.

According to an embodiment, a wire line network node unit, e.g. DSLAM, is provided, connecting simplified radio base stations, RSC-APs, the said DSLAM unit including switching facilities and facilities for encapsulating/decapsulating packet transported PDUs, and possibly also equivalent radio frames pertaining to e.g. WiFi, the said PDUs containing user data, e.g. DRB, and control/management data e.g. SRB, transmitted/received over an air interface between one of the simplified radio base stations and a UE connected to the one of the simplified radio base stations, where the said DSLAM unit is arranged to determine how to switch the PDUs or the equivalent radio frames, such that the PDUs, or the equivalent radio frames, can be terminated locally on the same or different instances of local PDCP entities, and RRC entities for control plane data, or the said PDUs can be terminated on a remote PDCP entity for the sake of closer co-processing with macro PDCP entities overlapping or otherwise related to the DSLAM-connected simplified radio base stations.

According to an embodiment, the simplified radio base stations may each comprise a packet wrapper/un-wrapper unit, to map PDUs to/from packet switching or circuit switching data connections. The said radio base stations may then operate as an IP Host to the rest of the network, i.e. it needs not contain any switching facilities.

According to an embodiment, the DSLAM unit is arranged for supporting local break out of traffic, by recovering the original PDUs, if necessary decrypt the PDUs, and switch them to another bearer flow to be transmitted to another unit, e.g. an RSC AP connect to the said DSLAM unit, or to another DSLAM unit in case of clustered deployments.

According to an embodiment, instead of PDUs, the RAN PDUs exchanged between the simplified radio base stations and the DSLAM-unit are at the RLC-level, i.e. RLC PDUs, or other level which does not interfere with air interface security mechanisms for integrity and/or authentication.

According to an embodiment, Multi-operator support at the LTE radio bearer level is provided. I e. different service or content or other providers are allowed to operate individual or groups of LTE radio bearers, to one and the same terminal.

According to another embodiment, the generic principle outlined above can also apply to DSLAM equivalents in coaxial distribution systems, e.g. head end, and in optical distribution systems, e.g. Optical Lite Terminations, OLT.

According to another embodiment, a Local IP Access, Selected IP Traffic Off-load, LIPA/SIPTO, may be added in the DSLAM unit.

According to an embodiment, the wire line network node may be capable of handling uplink communication not only for Radio Access Network PDUs but also for packets in other radio communication technologies such as WLAN PDUs.

According to an embodiment, the radio bearer carries tethered traffic, e.g. WiFi originated packets, which are then terminated appropriately on the DSLAM or higher up in the network.

Figure 6:
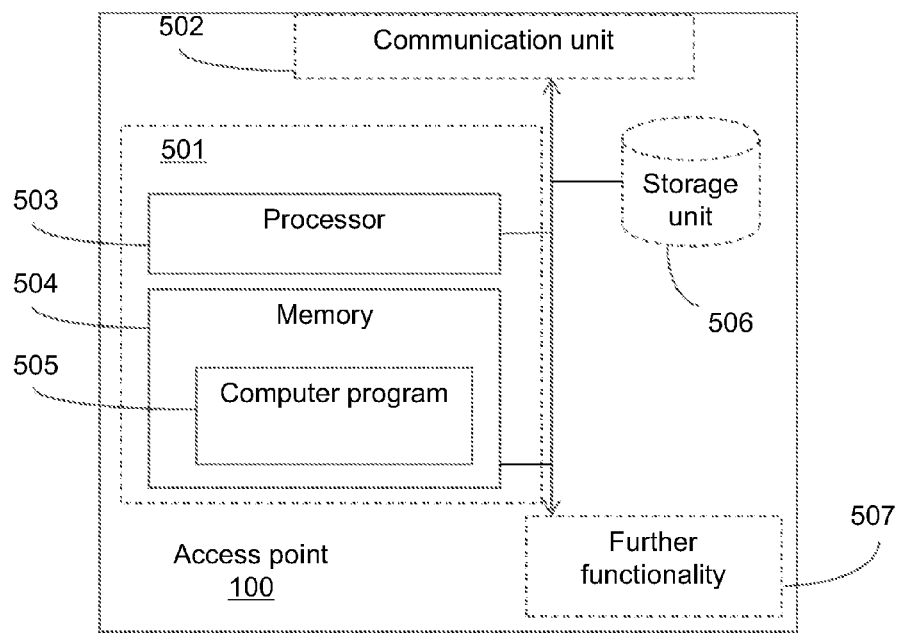
FIGS. 6-7 are block diagrams illustrating an access point in more detail, according to possible embodiments.

FIG. 6 shows an embodiment of an access point 100 configured for handling uplink communication in a communication system comprising the access point and a wire line network node 110 connected via wire line to the access point. The access point 100 comprises a processor 503 and a memory 504. The memory contains instructions executable by said processor, whereby said access point 100 is operative for receiving an integrity protected and/or encrypted packet data unit, PDU, from a user equipment, UE, 10, 11, 12 wirelessly connected to the access point and detecting type of the received PDU, the type of PDU being any of a signaling radio bearer type or a data radio bearer type. The access point 100 is further operative for encapsulating the received PDU by setting a header to the PDU, which header comprises an identity indicating the detected type of PDU and an identity indicating source address and/or destination address of the PDU, and sending the encapsulated PDU to the wire line network node.

According to an embodiment, said access point 100 is operative for encapsulating the received PDU by wrapping the PDU into a wire line transport protocol, e.g. Ethernet, MAC, MPLS, IPv6 or xDSL. According to another embodiment, the identity indicating the detected type of PDU is a MAC logical channel identity. According to another embodiment, the identity indicating source address and/or destination address in the header of the PDU is an identity indicating from which UE the PDU originates but not any identity indicating the access point.

The access point 100 may further comprise a communication unit 502, which may be considered to comprise conventional means for communicating from and/or to the other nodes in the network, such as UEs and the wire line network node 110. The conventional communication means may include at least one transmitter and at least one receiver. The access point may further comprise one or more storage units 506 and further functionality 507 useful for the access point to serve its purpose as wireless access point. The instructions executable by said processor may be arranged as a computer program 505 stored in said memory 504. The processor 503 and the memory 504 may be arranged in an arrangement 501. The arrangement 501 may alternatively be a micro processor and adequate software and storage therefore, a Programmable Logic Device, PLD, or other electronic component(s)/processing circuit(s) configured to perform the actions, or methods mentioned above.

The computer program 505 may comprise computer readable code means, which when run in the access point 100 causes the access point 110 to perform the steps described in any of the described embodiments. The computer program may be carried by a computer program product connectable to the processor. The computer program product may be the memory 504. The memory 504 may be realized as for example a RAM (Random-access memory), ROM (Read-Only Memory) or an EEPROM (Electrical Erasable Programmable ROM). Further, the computer program may be carried by a separate computer-readable medium, such as a CD, DVD or flash memory, from which the program could be downloaded into the memory 504. Alternatively, the computer program may be stored on a server or any other entity connected to the communication network to which the communication node has access via its communication unit 502. The computer program may then be downloaded from the server into the memory 504. Although the instructions described in the embodiments disclosed above are implemented as a computer program 505 to be executed by the processor 503 at least one of the instructions may in alternative embodiments be implemented at least partly as hardware circuits.

Figure 7:
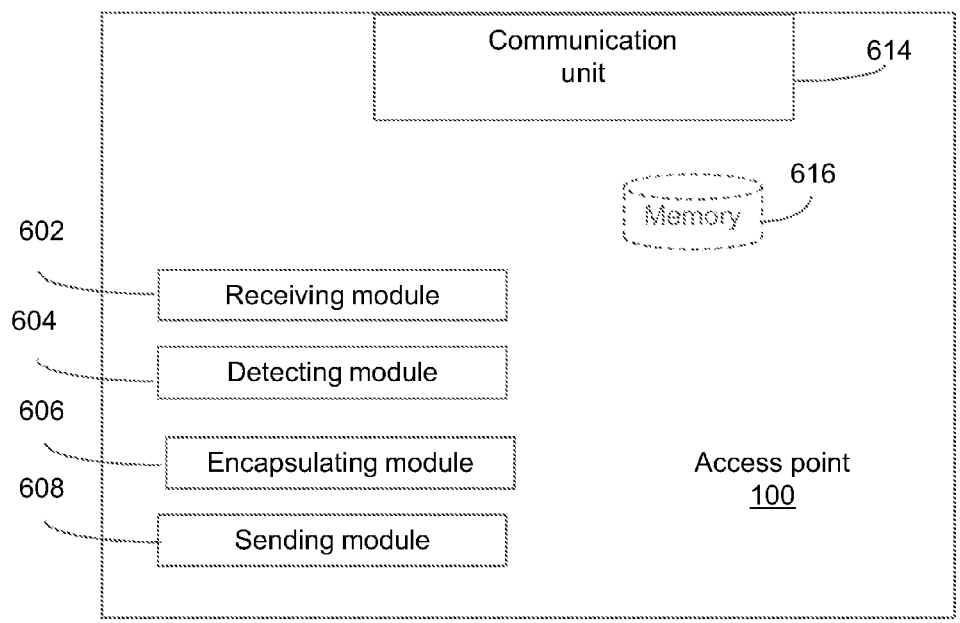

FIG. 7 shows an embodiment of an access point 100 operable in a communication system and configured for handling uplink communication in the communication system comprising the access point and a wire line network node 110 connected via wire line to the access point. The access point comprises a receiving module 602 for receiving an integrity protected and/or encrypted PDU from a UE 10, 11, 12 wirelessly connected to the access point and a detecting module 604 for detecting type of the received PDU, the type of PDU being any of a signaling radio bearer type or a data radio bearer type. The access point further comprises an encapsulating module 606 for encapsulating the received PDU by setting a header to the PDU, which header comprises an identity indicating the detected type of PDU and an identity indicating source address and/or destination address of the PDU, and a sending module 608 for sending the encapsulated PDU to the wire line network node.

Figure 8:
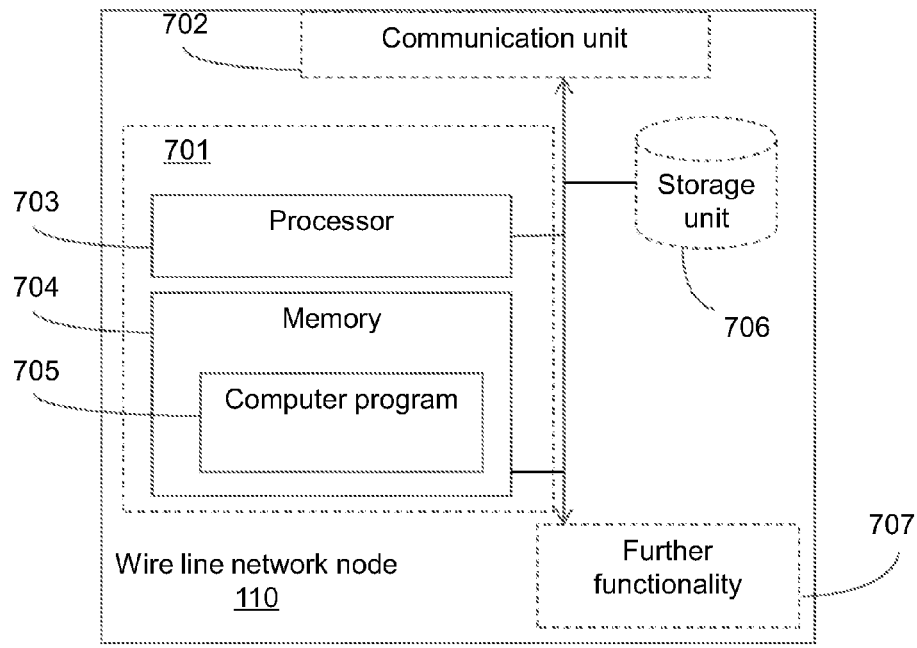
FIGS. 8-9 are block diagrams illustrating a wire line network node in more detail, according to possible embodiments.

FIG. 8 shows an embodiment of a wire line network node 110 configured for handling uplink communication in a communication system comprising the wire line network node and an access point 100, the wire line network node being connected via wire line to the access point. The wire line network node 110 comprises a processor 703 and a memory 704. Said memory contains instructions executable by said processor, whereby said wire line network node 110 is operative for receiving an integrity protected and/or encrypted and encapsulated PDU from the access point, the PDU originating from a user equipment, UE 10, 11, 12 wirelessly connected to the access point, the encapsulated PDU comprising a header comprising an identity identifying a type of PDU, the type of PDU being any of a signaling radio bearer type or a data radio bearer type, and an identity indicating source and/or destination address of the PDU. The wire line network node further being operative for detecting, based on the received identity identifying type of PDU, the type of the received PDU, decapsulating the received PDU and, if needed, controlling integrity of the decapsulated PDU and/or decrypting the decapsulated PDU based on the detected type of PDU.

According to an embodiment, the wire line network node is further connected to a number of packet treating entities, e.g. RRC, NAS, user plane, each packet treating entity being operative for handling PDUs of a certain type. The wire line network node 110 is further operative for forwarding the PDU, based on the detected type, to the packet treating entity of the number of packet treating entities adapted for handling PDUs of the detected type. The packet treating entity adapted for handling PDUs of the detected type is arranged for performing the decapsulation of the received PDU and, if needed, the controlling of integrity of the decapsulated PDU and/or the decryption of the decapsulated PDU. Thereby, the packet can be correctly treated by the wire line network node depending on type. The number of packet treating entities may be arranged in the wire line network node.

According to another embodiment, the wire line network node has a plurality of ports each port being adapted for receiving data from one access point out of a plurality of access points, and the access point from which the PDU is received is connected to a first port of the plurality of ports. The wire line network node 110 is further operative for acquiring information that the access point from which the PDU is received is connected to the first port, and mapping the received PDU to the access point from which the PDU is received based on the acquired information.

The wire line network node 110 may further comprise a communication unit 702, which may be considered to comprise conventional means for communicating from and/or to the other nodes in the network, such as the access point 100. The conventional communication means may include at least one transmitter and at least one receiver. The wire line network node may further comprise one or more storage units 706 and further functionality 507 useful for the access point to serve its purpose as wireless access point. The instructions executable by said processor may be arranged as a computer program 705 stored in said memory 704. The processor 703 and the memory 704 may be arranged in an arrangement 701. The arrangement 701 may alternatively be a micro processor and adequate software and storage therefore, a Programmable Logic Device, PLD, or other electronic component(s)/processing circuit(s) configured to perform the actions, or methods mentioned above.

The computer program 705 may comprise computer readable code means, which when run in the wire line network node 110 causes the wire line network node 110 to perform the steps described in any of the described embodiments. The computer program may be carried by a computer program product connectable to the processor. The computer program product may be the memory 704. The memory 704 may be realized as for example a RAM (Random-access memory), ROM (Read-Only Memory) or an EEPROM (Electrical Erasable Programmable ROM). Further, the computer program may be carried by a separate computer-readable medium, such as a CD, DVD or flash memory, from which the program could be downloaded into the memory 704. Alternatively, the computer program may be stored on a server or any other entity connected to the communication network to which the communication node has access via its communication unit 702. The computer program may then be downloaded from the server into the memory 704. Although the instructions described in the embodiments disclosed above are implemented as a computer program 705 to be executed by the processor 703 at least one of the instructions may in alternative embodiments be implemented at least partly as hardware circuits.

Figure 9:
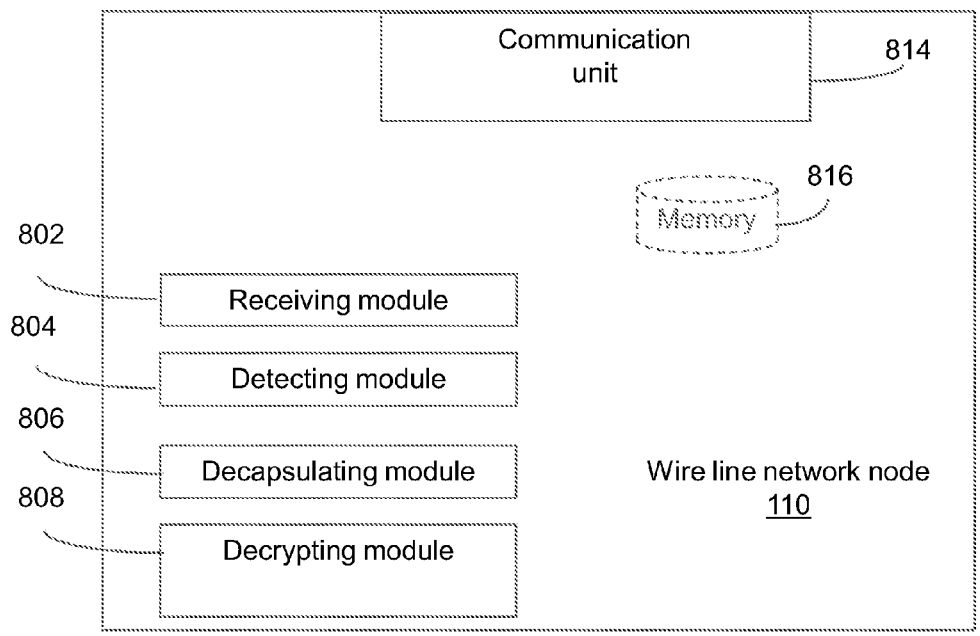

FIG. 9 shows an embodiment of a wire line network node 110 configured for handling uplink communication in a communication system comprising the wire line network node and an access point 100, the wire line network node being connected via wire line to the access point. The wire line network node 110 comprises a receiving module 802 for receiving an integrity protected and/or encrypted and encapsulated PDU from the access point, the PDU originating from a user equipment, UE 10, 11, 12 wirelessly connected to the access point, the encapsulated PDU comprising a header comprising an identity identifying a type of PDU, the type of PDU being any of a signaling radio bearer type or a data radio bearer type, and an identity indicating source and/or destination address of the PDU. The wire line network node further comprises a detecting module 804 for detecting, based on the received identity identifying type of PDU, the type of the received PDU, a decapsulating module 806 for decapsulating the received PDU and, if needed, a controlling module for controlling integrity of the decapsulated PDU and/or a decrypting module 808 for decrypting the decapsulated PDU based on the detected type of PDU.

Although the description above contains a plurality of specificities, these should not be construed as limiting the scope of the concept described herein but as merely providing illustrations of some exemplifying embodiments of the described concept. It will be appreciated that the scope of the presently described concept fully encompasses other embodiments which may become obvious to those skilled in the art, and that the scope of the presently described concept is accordingly not to be limited. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for an apparatus or method to address each and every problem sought to be solved by the presently described concept, for it to be encompassed hereby.

The invention claimed is:

1. A method performed by a Residential Small Cell (RSC)-access point for handling uplink communication in a communication system comprising the RSC-access point and a wire line network node connected via wire line to the RSC-access point, the method comprising:
   receiving from a user equipment (UE) that is wirelessly connected to the RSC-access point, a packet data unit (PDU) that is at least one of encrypted and integrity protected;
   detecting a type of the received PDU as a signaling radio bearer type or a data radio bearer type;
   encapsulating the received PDU by setting a header to the PDU, the header comprising an identity indicating the detected type of PDU as the signaling radio bearer type or the data radio bearer type, and an identity indicating at least one of a source address and a destination address of the PDU; and
   sending the encapsulated PDU to the wire line network node via the wire line, wherein a connection via the wire line is configured to identify the RSC-access point to the wire line network node, for further uplink transfer of the PDU based on the type of the PDU.

2. The method according to claim 1, wherein the PDU is encapsulated by wrapping the PDU into one of the following wire line transport protocols: Ethernet, Medium Access Control (MAC), Multiprotocol Label Switching (MPLS), IPv6 or xDSL.

3. The method according to claim 1, wherein the identity indicating the detected type of PDU is a Medium Access Control (MAC) logical channel identity.

4. The method according to claim 1, wherein the identity indicating at least one of the source address and the destination address in the header of the PDU is an identity indicating from which UE the PDU originates but not any identity indicating the SC-access point.

5. The method according to claim 1, wherein the identity indicating at least one of the source address and the destination address in the header of the PDU is either pre-configured or automatically provisioned.

6. The method according to claim 1, wherein the identity indicating at least one of the source address and the destination address of PDUs used in the RSC-access point is independent from any identity indicating at least one of a source address and a destination address of a PDU used in other access points in the communication system connected via wire line to the wire line network node.

7. A method performed by a wire line network node for handling uplink communication in a communication system comprising the wire line network node and a Residential Small Cell (RSC)-access point, the wire line network node being connected via wire line to the RSC-access point, the method comprising:
  receiving, from the RSC-access point via the wire line, an encapsulated packet data unit (PDU) that is at least one of integrity protected and encrypted, the PDU originating from a user equipment (UE) wirelessly connected to the RSC-access point, the encapsulated PDU comprising a header comprising an identity identifying a type of PDU as a signaling radio bearer type or a data radio bearer type, and an identity indicating one or both of a source address and a destination address of the PDU, wherein a connection via the wire line is configured to identify the RSC-access point to the wire line network node;
  detecting the type of the received PDU as the signaling radio bearer type or the data radio bearer type;
  performing, based on the detected type of PDU, at least one of:
    decapsulating the received PDU;
    decrypting the received PDU; and
    controlling integrity of the received PDU; and
  forwarding the received PDU for further uplink transfer based on the type of the PDU received by the wire line network node.

8. The method according to claim 7, wherein the forwarding further comprising:
  forwarding the PDU, based on the detected type, to a packet treating entity operative to treat PDUs of the detected type,
  and wherein the packet treating entity is operative to perform at least one of the decapsulating, the decrypting and the controlling the integrity.

9. The method according to claim 7, wherein the wire line network node has a plurality of ports, each port being operative to receive data from one access point of a plurality of access points, and the one access point from which the PDU is received is connected to a first port of the plurality of ports, the method further comprising:
  acquiring information that the RSC-access point from which the PDU is received is connected to the first port, and
  mapping the received PDU to the RSC-access point from which the PDU is received based on the acquired information.

10. An access point, operative as a Residential Small Cell (RSC)-access point, to handle uplink communication in a communication system comprising the access point and a wire line network node connected via wire line to the access point, the access point comprising:
  a processor and a memory, said memory containing instructions executable by said processor, said instructions which when executed by said processor, cause said access point to be operative to:
    receive, from a user equipment (UE) wirelessly connected to the access point, a packet data unit (PDU), that is at least one of integrity protected and encrypted;
    detect a type of the received PDU as a signaling radio bearer type or a data radio bearer type;
    encapsulate the received PDU, that is at least one of integrity protected and encrypted, by setting a header to the PDU, which header comprises an identity indicating the detected type of PDU as the signaling radio bearer type or the data radio bearer type, and an identity indicating at least one of a source address and a destination address of the PDU; and
    send the encapsulated PDU to the wire line network node via the wire line, wherein a connection via the wire line is operative to identify the access point to the wire line network node, for further uplink transfer of the PDU based on the type of the PDU.

11. The access point according to claim 10, wherein said access point is operative to encapsulate the received PDU by wrapping the PDU into one of the following wire line transport protocols: Ethernet, Medium Access Control (MAC), Multiprotocol Label Switching (MPLS), IPv6 or xDSL.

12. The access point according to claim 10, wherein the identity indicating the detected type of PDU is a Medium Access Control (MAC) logical channel identity.

13. The access point according to claim 10, wherein the identity indicating at least one of the source address and the destination address in the header of the PDU is an identity indicating from which UE the PDU originates but not any identity indicating the access point.

14. A wire line network node operative to handle uplink communication in a communication system comprising the wire line network node and a Residential Small Cell (RSC)-access point, the wire line network node being connected via wire line to the RSC-access point, the wire line network node comprising:
  a processor and a memory, said memory containing instructions executable by said processor, the instructions which when executed by said processor, cause said wire line network node to be operative to:
    receive from the RSC-access point via the wire line, an encapsulated packet data unit (PDU) that is at least one of integrity protected and encrypted, the PDU originating from a user equipment (UE) wirelessly connected to the RSC-access point and, the encapsulated PDU comprising a header comprising an identity identifying a type of PDU as a signaling radio bearer type or a data radio bearer type, and an identity indicating at least one of a source address and a destination address of the PDU, wherein a connection via the wire line is operative to identify the RSC-access point to the wire line network node;
    detect the type of the received PDU as the signaling radio bearer type or the data radio bearer type;
    based on the type of the received PDU, the wire line network node is operative to perform at least one of:

decapsulate the received PDU;
decrypt the received PDU; and
control integrity of the received PDU; and
forward the received PDU for further uplink transfer based on the type of the PDU received by the wire line network node.

15. The wire line network node according to claim 14, further being connected to a number of packet treating entities, each packet treating entity being operative to handle PDUs of a certain type, and wherein the wire line network node is further operative to forward the PDU, based on the detected type, to a packet treating entity that is a Radio Resource Control (RRC) or Non-Access Stratum (NAS) to handle PDUs of the detected type,
and wherein the packet treating entity operative to handling PDUs of the detected type is operative to decapsulate the received PDU; and
based on the type of the received PDU, the wire line network node is operative to perform at least one of:
decrypt the decapsulated PDU and
control integrity of the decapsulated PDU.

16. The wire line network node according to claim 14, wherein the wire line network node has a plurality of ports, each port operative to receive data from one access point of a plurality of access points, and the RSC-access point from which the PDU is received is connected to a first port of the plurality of ports, the wire line network node further being operative to:
acquire information that the RSC-access point from which the PDU is received is connected to the first port, and
map the received PDU to the RSC-access point from which the PDU is received based on the acquired information.

17. A non-transitory computer readable storage medium storing instructions, which when executed by a processor in a Residential Small Cell (RSC)-access point for handling uplink communication in a communication system comprising the RSC-access point and a wire line network node connected via wire line to the RSC-access point, cause the RSC-access point to perform operations comprising:
receiving from a user equipment (UE) wirelessly connected to the RSC-access point and, a packet data unit (PDU) that is at least one of integrity protected and encrypted;
detecting a type of the received PDU as a signaling radio bearer type or a data radio bearer type;
encapsulating the received PDU by setting a header to the PDU, which header comprises an identity indicating the detected type of PDU as the signaling radio bearer type or the data radio bearer type and an identity indicating at least one of a source address and a destination address of the PDU; and
sending the encapsulated PDU to a wire line network node via the wire line, wherein a connection via the wire line is configured to identify an identity of the RSC-access point to the wire line network node, for further uplink transfer of the PDU based on the type of the PDU.

18. A non-transitory computer readable storage medium storing instructions, which when executed by a processor in a wire line network node for handling uplink communication in a communication system comprising the wire line network node and a Residential Small Cell (RSC)-access point, the wire line network node being connected via wire line to the RSC-access point, cause the wire line network node to perform operations comprising:
receiving from the RSC-access point via the wire line, an encapsulated packet data unit (PDU) that originated from a user equipment (UE) wirelessly connected to the RSC-access point and, the PDU, that is at least one of integrity protected and encrypted, comprising a header comprising an identity identifying a type of PDU as a signaling radio bearer type or a data radio bearer type, and an identity indicating one or both of a source address and a destination address of the PDU, wherein a connection via the wire line is configured to identify the RSC-access point to the wire line network node;
detecting the type of the received PDU as a signaling radio bearer type or a data radio bearer type;
performing, based on the detected type of PDU, at least one of:
decapsulating the received PDU;
decrypting the received PDU; and
controlling integrity of the received PDU; and
forwarding the received PDU for further uplink transfer based on the type of the PDU received by the wire line network node.

* * * * *

UNITED STATES PATENT AND TRADEMARK OFFICE
CERTIFICATE OF CORRECTION

PATENT NO. : 9,509,605 B2
APPLICATION NO. : 14/365036
DATED : November 29, 2016
INVENTOR(S) : Laraqui et al.

Page 1 of 2

It is certified that error appears in the above-identified patent and that said Letters Patent is hereby corrected as shown below:

On the Title Page

In Item (72), under "Inventors", in Column 1, Line 2, delete "Hagersten" and insert -- Hägersten --, therefor.

In the Figure, in Step "206", Line 3, delete "identifying" and insert -- indicating --, therefor.

On Page 2, in Item (56), under "OTHER PUBLICATIONS", in Column 2, Line 7, delete "Gprs" and insert -- GPRS --, therefor.

On Page 2, in Item (56), under "OTHER PUBLICATIONS", in Column 2, Line 12, delete "protocols." and insert -- protocols, --, therefor.

In the Drawings

In Fig. 2, Sheet 2 of 5, in Step "206", Line 3, delete "identifying" and insert -- indicating --, therefor.

In the Specification

In Column 3, Lines 29-30, delete "embodiments" and insert -- embodiments. --, therefor.

In Column 4, Line 30, delete "Access" and insert -- Access Control --, therefor.

In Column 4, Line 32, delete "(PDCP) Protocols" and insert -- Protocols (PDCP) --, therefor.

In Column 8, Line 26, delete "5 GDSLAM." and insert -- 5G DSLAM. --, therefor.

In Column 8, Lines 30-31, delete "5 GDSLAM," and insert -- 5G DSLAM, --, therefor.

Signed and Sealed this
Sixth Day of June, 2017

Michelle K. Lee
*Director of the United States Patent and Trademark Office*

CERTIFICATE OF CORRECTION (continued)
U.S. Pat. No. 9,509,605 B2

In Column 9, Line 5, delete "5 GDSLAM" and insert -- 5G DSLAM --, therefor.

In Column 9, Line 12, delete "5 GDSLAM" and insert -- 5G DSLAM --, therefor.

In Column 9, Line 21, delete "5 GDSLAM" and insert -- 5G DSLAM --, therefor.

In Column 9, Line 29, delete "5 GDSLAM." and insert -- 5G DSLAM. --, therefor.

In Column 10, Line 24, delete "an packet" and insert -- a packet --, therefor.

In Column 11, Line 11, delete "Lite" and insert -- Line --, therefor.

In Column 12, Line 5, delete "access point 110" and insert -- access point 100 --, therefor.

In the Claims

In Column 15, Line 8, in Claim 4, delete "SC-access" and insert -- RSC-access --, therefor.